(12) United States Patent
Venkatesha et al.

(10) Patent No.: US 9,104,933 B2
(45) Date of Patent: Aug. 11, 2015

(54) COVERT BAR CODE PATTERN DESIGN AND DECODING

(71) Applicant: Honeywell International Inc., Morristown, NJ (US)

(72) Inventors: Sharath Venkatesha, Minnetonka, MN (US); Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/165,173

(22) Filed: Jan. 27, 2014

(65) Prior Publication Data

US 2014/0209685 A1    Jul. 31, 2014

Related U.S. Application Data

(60) Provisional application No. 61/758,032, filed on Jan. 29, 2013.

(51) Int. Cl.
*G06K 19/00* (2006.01)
*G06K 7/14* (2006.01)
*G06K 19/06* (2006.01)
*B41M 3/14* (2006.01)

(52) U.S. Cl.
CPC ............ *G06K 7/1434* (2013.01); *B41M 3/144* (2013.01); *G06K 7/1443* (2013.01); *G06K 19/0614* (2013.01); *G06K 19/06056* (2013.01); *G06K 19/06131* (2013.01)

(58) Field of Classification Search
CPC ..................................................... B41M 3/144
USPC ........................................... 235/494; 283/91
See application file for complete search history.

(56) References Cited

U.S. PATENT DOCUMENTS

| | | | |
|---|---|---|---|
| 6,203,069 B1 * | 3/2001 | Outwater et al. | 283/88 |
| 6,398,117 B1 | 6/2002 | Oakeson et al. | |
| 7,264,169 B2 * | 9/2007 | Juds | 235/468 |
| 7,341,196 B2 * | 3/2008 | Sandrini et al. | 235/487 |
| 7,513,437 B2 * | 4/2009 | Douglas | 235/492 |
| 7,537,160 B2 | 5/2009 | Silverbrook et al. | |
| 7,878,404 B2 | 2/2011 | Napper et al. | |
| 8,727,221 B1 | 5/2014 | Davalos et al. | |
| 2009/0108081 A1 * | 4/2009 | Zwirner et al. | 235/494 |
| 2009/0134227 A1 * | 5/2009 | Roth | 235/491 |
| 2013/0147938 A1 | 6/2013 | McCloskey et al. | |
| 2013/0282609 A1 | 10/2013 | Au et al. | |

FOREIGN PATENT DOCUMENTS

| | | | |
|---|---|---|---|
| EP | 2653772 | 10/2013 | |
| WO | WO 2010015881 A1 * | 2/2010 | G06F 3/03 |

OTHER PUBLICATIONS

Derek Reilly, et al. "Toward fluid, mobile and ubiquitous interaction with paper using recursive 2D barcodes" 3rd International Workshop on Pervasive Mobile Interaction Devices, May 13, 2007 (4 pgs.).

* cited by examiner

*Primary Examiner* — Christle I Marshall
(74) *Attorney, Agent, or Firm* — Brooks, Cameron & Huebsch, PLLC

(57) ABSTRACT

Devices, methods, and systems for covert bar code pattern design and decoding are described herein. One covert bar code includes detector code and decoder code. The detector code includes a combination of responsive absorptive material and responsive reflective material, and the decoder code includes a combination of responsive absorptive material and responsive reflective material.

19 Claims, 3 Drawing Sheets

COVERT BAR CODE PATTERN DESIGN AND DECODING

CROSS-REFERENCE TO RELATED APPLICATIONS

This application is a non-provisional of U.S. Provisional Application Ser. No. 61/758,032, filed Jan. 29, 2013, the entire specification of which is incorporated herein by reference.

TECHNICAL FIELD

The present disclosure relates to devices, methods, and systems for covert bar code pattern design and decoding.

BACKGROUND

A bar code is a representation of data, such as, for instance, an optical machine-readable representation of data. For example, a bar code can represent data using a number of parallel lines and/or the spacing between the lines. Such a bar code can be referred to as a one-dimensional bar code.

As an additional example, a bar code can represent data using a number of geometrical shapes and/or patterns, such as, for instance, squares, triangles, circles, dots, and/or hexagons, among other geometrical shapes and/or patterns. Such a bar code can be referred to as a two-dimensional bar code.

A bar code can be used to represent data associated with an object, among other uses. For example, a bar code representing data associated with an object can be placed on the object (e.g., on the packaging or container of the object) or embedded in the object. The bar code can then be used to recognize and/or track the object.

A bar code imager is used to read a bar code (e.g., to recognize the bar code and/or identify the data represented by the bar code). Reading a bar code can include, for example, creating and/or capturing an image of the bar code.

Covert bar codes (e.g., invisible bar codes) are bar codes that are invisible to the human eye in visible light and are activated with the use of near-infrared (NIR) or ultraviolet (UV) light. The chemicals used for printing covert bar codes determine the wavelength of the light spectrum which excites the material, rendering the bar code visible for detection and decoding.

A bar code imager used to read a covert bar code uses NIR or UV light of the necessary spectrum to activate the chemical materials of the bar code. The activated bar code thus appears to be a regular grayscale bar code, which is captured by the imager.

DETAILED DESCRIPTION

Figure 1A:
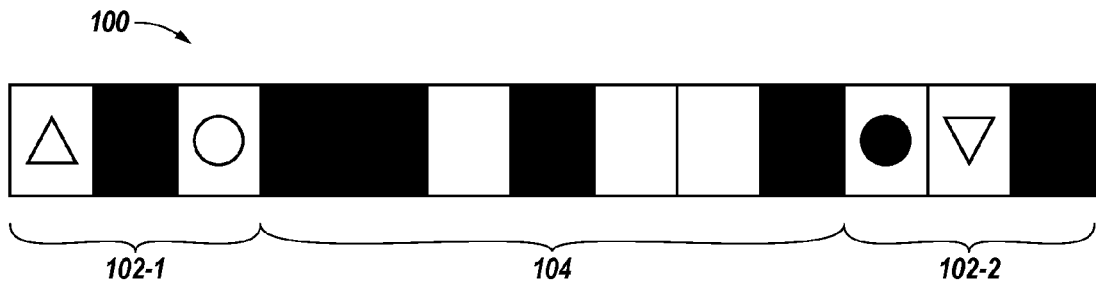
FIG. 1A illustrates a bar code having a pattern design in accordance with one or more embodiments of the present disclosure.

Devices, methods, and systems for covert bar code pattern design and decoding are described herein. For example, one or more embodiments include a covert bar code comprising detector code and decoder code. The detector code includes a combination of responsive absorptive material and responsive reflective material, and the decoder code includes a combination of responsive absorptive material and responsive reflective material.

Bar codes in accordance with one or more embodiments of the present disclosure can be covert bar codes (e.g., "invisible" bar codes). That is, bar codes in accordance with one or more embodiments of the present disclosure can be invisible to the human eye in visible light (e.g., light having a wavelength of 380 nanometers (nm) to 740 nm), and can be activated with the use of ultraviolet (UV) light (e.g., light having a wavelength of 10 nm to 380 nm) and/or infrared (IR) light (e.g., light having a wavelength of 740 nm to 1 millimeter), such as near-IR (NIR) light (e.g., light having a wavelength of 740 nm to 1400 nm). The chemicals used for printing the bar codes can determine the wavelength of the light spectrum which excites the material, rendering the bar code visible for detection and decoding.

Further, bar codes in accordance with one or more embodiments of the present disclosure can be constructed with a combined set of chemicals that can reflect and/or absorb specific wavelengths of NIR and/or UV light. As an example, a bar code in accordance with one or more embodiments can be constructed using two materials which reflect and/or absorb 800 nm and 1000 nm NIR light. In this example, the information decoded will be different based on the wavelength of the incident NIR light. Combining different materials in such a manner can increase the information decoding security, as it is coupled with the wavelength of the incident light. Printers using a special ink can be used for printing such bar codes.

Bar code pattern designs in accordance with one or more embodiments of the present disclosure can be decoded more robustly and/or with lower processor usage than previous bar code pattern designs, such as UPC code, QR code, Aztec code, Shot code, and Maxi code pattern designs, among other previous pattern designs. For example, bar code pattern designs in accordance with one or more embodiments of the present disclosure can be detected in a cluttered environment, which is in contrast to previous bar code pattern designs, for which bar code imagers (e.g., scanners) assume the primary presence of the bar code pattern in its field of view.

Further, bar code pattern designs in accordance with one or more embodiments of the present disclosure can be overlaid on existing text and/or graphic matter in the visible spectrum. The pattern design can be printed using a printer that first prints a plain NIR reflective substrate, and then prints a specific pattern using NIR absorptive material.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1A, and a similar element may be referenced as 200 in FIG. 2.

As used herein, "a" or "a number of" something can refer to one or more such things. For example, "a number of devices" can refer to one or more devices.

FIG. 1A illustrates a bar code 100 having a pattern design in accordance with one or more embodiments of the present disclosure. As shown in FIG. 1A, the pattern design has two parts: detector code pair 102 (e.g., detector code 102-1 and 102-2) and decoder code 104. The detector code pair can be a reference code used to detect the presence and location of the pattern in the field of view of the bar code imager (e.g., scanner), and the decoder code can include the information (e.g., data) to be decoded by the bar code imager.

The detector code can be a pattern constructed using a combination of responsive absorptive material and responsive reflective material. The responsive absorptive material and responsive reflective material can be, for example, IR (e.g., NIR) or UV absorptive material (e.g., coating), and IR (e.g., NIR) or UV reflective material (e.g., coating), respectively. That is, the responsive absorptive material and responsive reflective material can respond to (e.g., absorb and reflect, respectively) wavelengths of IR, NIR, and/or UV radiation.

As an example, the detector code can include alternating NIR absorptive and NIR reflective materials to create a pattern that appears black-white-black or white-black-white when viewed under NIR illumination. For instance, in the embodiment illustrated in FIG. 1A, detector code 102-1 includes alternating NIR reflective (represented by white) and NIR absorptive (represented by black) materials that creates a pattern that appears white-black-white when viewed under NIR illumination. As an additional example, the detector code can include consecutive NIR absorptive and/or NIR reflective materials. For instance, in the embodiment illustrated in FIG. 1A, detector code 102-2 includes consecutive NIR reflective material. However, embodiments of the present disclosure are not limited to the pattern and/or combination of NIR absorptive and NIR reflective materials illustrated in FIG. 1A.

Further, as shown in FIG. 1A, the detector code can include geometrical shapes and/or patterns, such as, for instance, squares, triangles, circles, dots, and/or hexagons, among other geometrical shapes and/or patterns. For example, in the embodiment illustrated in FIG. 1A, the NIR reflective material of detector code 102-1 includes a triangle and a circle, and the NIR reflective material of detector code 102-2 includes a dot and a triangle. However, embodiments of the present disclosure are not limited to the geometrical shape(s) or pattern(s) illustrated in FIG. 1A.

The detector code can be used to determine the size and/or boundary parameters of the decoder code. Further, the detector code can be used to determine the orientation of the decoder code (e.g., whether the decoder code should be read by the bar code imager from right to left or from left to right). Further, the number of detector codes can be used to determine the shape of the decoder code pattern.

The decoder code can be a pattern constructed in the area defined by the detector code. For example, in the embodiment illustrated in FIG. 1A, detector code 104 is located between detector code 102-1 and detector code 102-2.

The decoder code can be a pattern constructed using a combination of responsive absorptive material and responsive reflective material. The responsive absorptive material and responsive reflective material can be, for example, IR (e.g., NIR) or UV absorptive material (e.g., coating) and IR (e.g., NIR) or UV reflective material (e.g., coating), respectively. That is, the responsive absorptive material and responsive reflective material can respond to (e.g., absorb and reflect, respectively) wavelengths of IR, NIR, and/or UV radiation.

For example, the detector code can include alternating and/or consecutive NIR absorptive and/or NIR reflective materials. For instance, in the embodiment illustrated in FIG. 1A, decoder code 104 includes consecutive NIR absorptive materials, alternating NIR reflective and NIR absorptive materials, and consecutive NIR reflective materials. However, embodiments of the present disclosure are not limited to the pattern and/or combination of NIR absorptive and NIR reflective materials illustrated in FIG. 1A. Further, although not shown in the example illustrated in FIG. 1A, the decoder code can include geometrical shapes and/or patterns, such as, for instance, squares, triangles, circles, dots, and/or hexagons, among other geometrical shapes and/or patterns.

The design, shape, and/or size (e.g., area) of the decoder code may depend on the amount of information to be included (e.g., encoded) in the decoder code. For example, the size of the decoder code may increase as the amount of information to be included in the decoder code increases.

The decoder code can include a one-dimensional or two-dimensional pattern of binary information, with the ones defined by the presence of NIR reflective material (represented by white in FIG. 1A) and the zeros defined by the presence of NIR absorptive material (represented by black in FIG. 1A), or vice versa. The information encoded in the pattern can be numeric and/or text. The information to be encoded can be converted to a binary matrix using an algorithm specific method, which can then be encoded in the pattern of the decoder code.

Figure 1B:
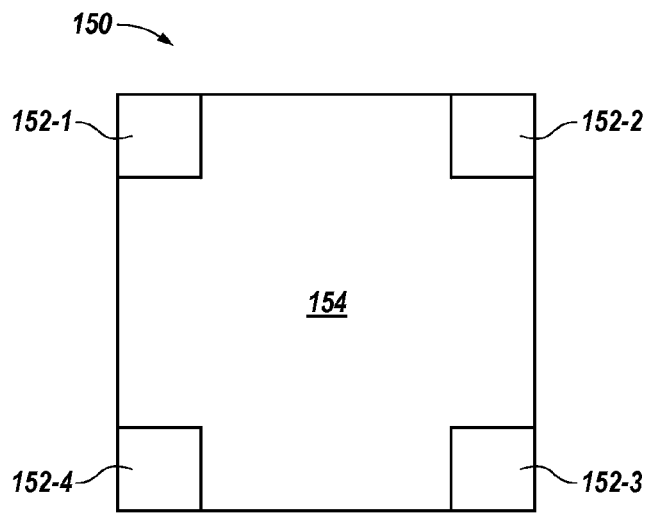
FIG. 1B illustrates a two-dimensional bar code having a pattern design in accordance with one or more embodiments of the present disclosure.

FIG. 1B illustrates a two-dimensional (2D) bar code 150 having a pattern design in accordance with one or more embodiments of the present disclosure. In a manner similar to the pattern design illustrated in FIG. 1A, the pattern design illustrated in FIG. 1B includes two parts: detector code 152 (e.g., detector code 152-1, 152-2, 152-3, and 152-4) and decoder code 154. The detector code can be a reference code used to detect the presence and location of the pattern in the field of view of the bar code imager (e.g., scanner), and the decoder code can include the information (e.g., data) to be decoded by the bar code imager, in a manner analogous to the detector code and decoder code previously described in connection with FIG. 1A.

The detector code and decoder code can be patterns constructed using a combination of IR (e.g., NIR) or UV absorptive material (e.g., coating) and IR (e.g., NIR) or UV reflective material (e.g., coating), in a manner analogous to the detector code and decoder code previously described in connection with FIG. 1A. Further, the information encoded in the decoder code pattern can be encoded using previous visible bar code pattern designs, such as UPC code, QR code, Aztec code, Shot code, and Maxi code, among other previous pattern designs.

The design, shape, and/or size (e.g., area) of 2D bar code 150 may depend on the amount of information to be included (e.g., encoded) in the decoder code. Further, the shape of the bar code may be determined by the number of detector code patterns enclosing the decoder code.

Figure 1C:
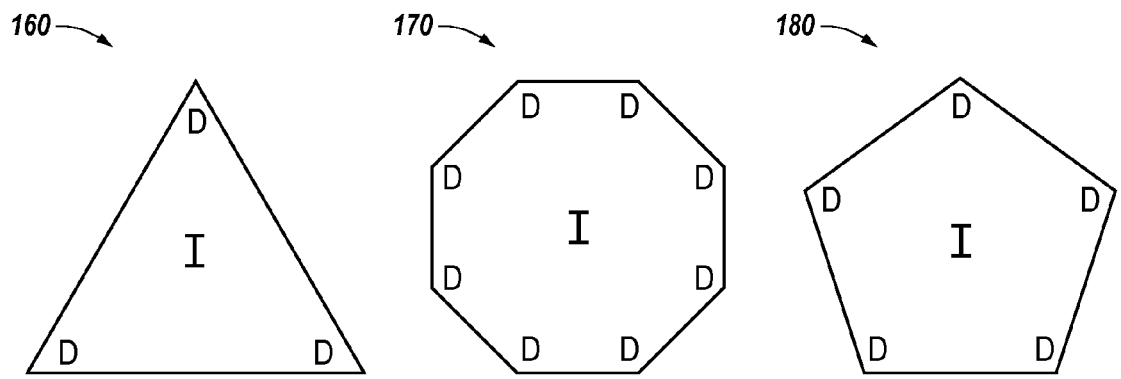
FIG. 1C illustrates two-dimensional bar codes having different shapes in accordance with one or more embodiments of the present disclosure.

FIG. 1C illustrates 2D bar codes 160, 170, and 180 having different shapes in accordance with one or more embodiments of the present disclosure. As shown in FIG. 1C, bar code 160 has a triangular shape, bar code 170 has an octagonal shape, and bar code 180 has a pentagonal shape. However, embodiments of the present disclosure are not limited to the shapes illustrated in FIG. 1C.

As shown in FIG. 1C, bar codes 160, 170, and 180 include detector code (represented by "D") and decoder code (represented by "I") in a manner similar to bar codes 100 and 150 previously described in connection with FIGS. 1A and 1B, respectively. The detector code and decoder code can be constructed in a manner analogous to the detector codes and decoder codes previously described in connection with FIGS. 1A and 1B. As such, the detector code patterns and decoder code patterns can be combined to form different polygonal shapes and can include different internal geometrical shapes and/or patterns, as illustrated in FIG. 1C. However, embodiments of the present disclosure are not limited to the external or internal shapes or patterns illustrated in FIG. 1C.

Figure 2:
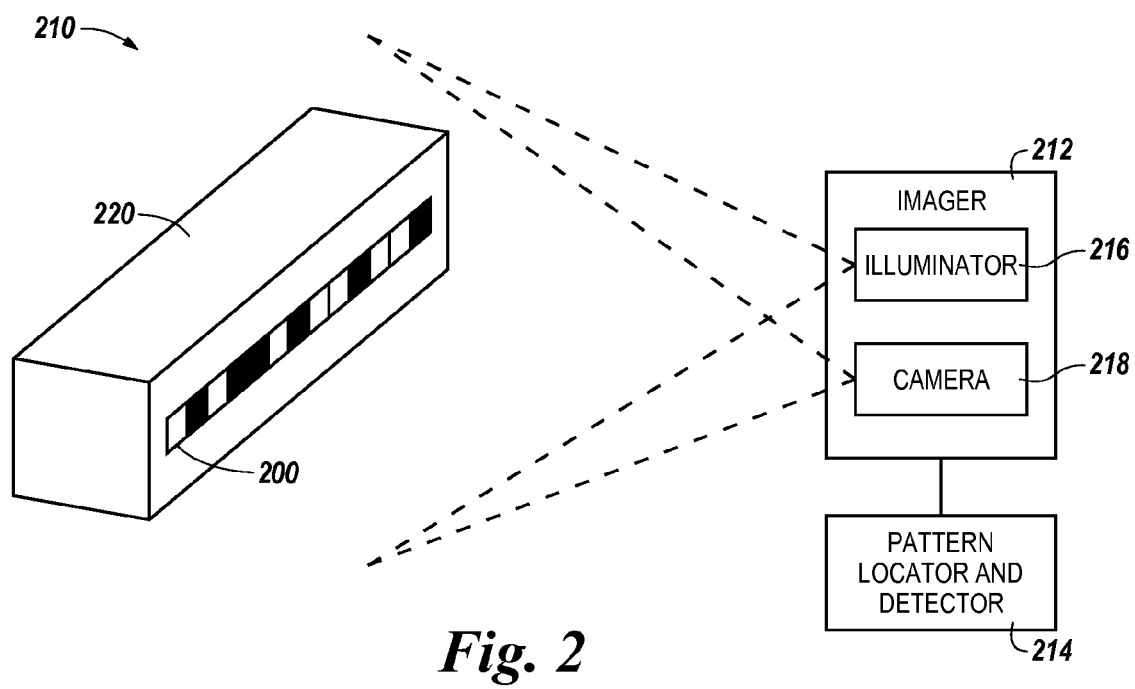
FIG. 2 illustrates a system for detecting and decoding a bar code pattern design in accordance with one or more embodiments of the present disclosure.

FIG. 2 illustrates a system 210 for detecting and decoding a bar code pattern design in accordance with one or more embodiments of the present disclosure. As shown in FIG. 2, system 210 includes a scanner (e.g., imager) 212 and pattern locator and detector 214. Although pattern locator and detector 214 is separate from and coupled to scanner 212 in the embodiment illustrated in FIG. 2, embodiments of the present disclosure are not so limited. For example, in some embodiments, the pattern locator and detector can be located in (e.g., a part of) the scanner.

In the example illustrated in FIG. 2, scanner 212 is a two-dimensional imager. However, embodiments of the present disclosure are not so limited. For example, in some embodiments, scanner 212 can be a one or two-dimensional scanner.

In the example shown in FIG. 2, imager 212 includes an illuminator 216 and a camera 218. Illuminator 216 can be, for example, an NIR illuminator (e.g., illuminator 216 can emit NIR light). The illuminator may have the capability to emit light of different wavelengths, including multiple NIR and UV bands. Camera 218 can be responsive to the wavelength of the light (e.g., the NIR light) emitted by illuminator 216.

Although the imager illustrated in FIG. 2 includes one camera, embodiments of the present disclosure are not so limited. For example, some embodiments can include multiple cameras, each of which can be responsive to a different wavelength of light.

Pattern locator and detector 214 can be, for example, a computing device such as, for example, an embedded processor, a laptop computer, a desktop computer, or a mobile device (e.g., a mobile phone, a personal digital assistant, etc.), among other types of computing devices. For instance, although not shown in FIG. 2 for clarity and so as not to obscure embodiments of the present disclosure, pattern locator and detector 214 can include a memory and a processor.

The memory can be any type of storage medium that can be accessed by the processor to perform various examples of the present disclosure. For example, the memory can be a non-transitory computer readable medium having computer readable instructions (e.g., computer program instructions) stored thereon that are executable by the processor to detect and decode a bar code pattern design in accordance with one or more embodiments of the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

The memory can be located in pattern locator and detector 214. However, embodiments of the present disclosure are not so limited. For example, in some embodiments, the memory can be located internal to another computing resource (e.g., enabling computer readable instructions to be downloaded over the Internet or another wired or wireless connection).

The processor (e.g., processing unit) of pattern locator and detector 214 may include a DSP, FPGA, a microcontroller, or other type of hardware capable of executing a set of instructions, and a computing coprocessor which may be based on an ARM or GPU based architecture. The processor may also have the capability to connect to cameras with multiple different video configurations, resolutions, and video encode/decode standards. In embodiments in which multiple imagers are used, the processor can combine the input images for decoding.

Imager 212 can capture an image (e.g., scene) that may include a bar code having a pattern design in accordance with one or more embodiments of the present disclosure. For instance, in the example illustrated in FIG. 2, imager 212 can capture a scene that includes an object 220 having bar code 200 thereon or embedded therein. Bar code 200 can be analogous to bar code 100 previously described in connection with FIG. 1A (e.g., bar code 200 can have a pattern design analogous to the pattern design previously described in connection with FIG. 1A).

The captured image can be searched for the presence of the detector code of bar code 200. For example, as the scene is illuminated by the NIR light emitted by illuminator 216, the detector code pattern may appear as a combination of black and white regions corresponding to the combination of the NIR absorptive and NIR reflective materials, respectively. An algorithm can search for the detector code pattern and determine its location(s). Because the detector code pattern may be binary and/or have a high contrast ratio, the algorithm can quickly and/or efficiently detect the pattern.

Once the presence of the detector code pattern and its location(s) are established, the bounding shape and/or size of the decoder code pattern can be determined (e.g., calculated). A decoder algorithm can then be applied on the enclosed region (e.g., on the decoder code bounded by the detector code) to decode the information encoded by the decoder code. Because the decoder code pattern may be binary and/or have a high contrast ratio, the decoder algorithm can quickly and/or efficiently decode the information encoded by the decoder code. The image can then be processed to detect the decoded one-dimensional or two-dimensional binary matrix from which the encoded information is extracted.

Figure 3:
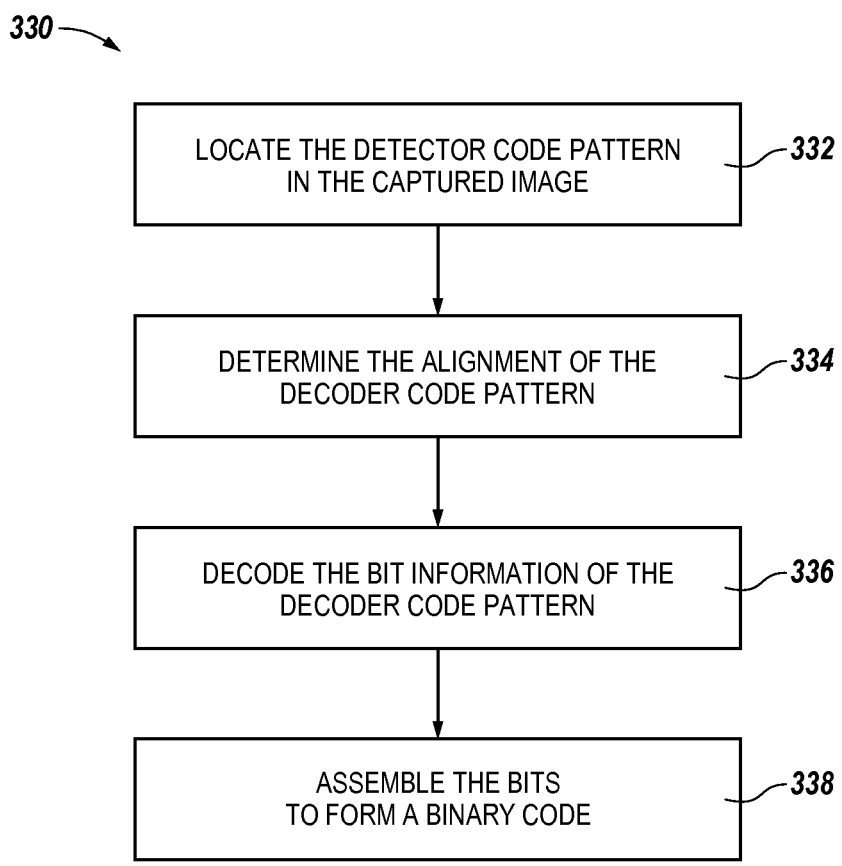
FIG. 3 illustrates a method for detecting and decoding a bar code pattern design in accordance with one or more embodiments of the present disclosure.

FIG. 3 illustrates a method 330 for detecting and decoding a bar code pattern design in accordance with one or more embodiments of the present disclosure. Method 330 can be performed by, for example, pattern locator and detector 214 previously described in connection with FIG. 2. The bar code pattern design can be, for example, the pattern design of bar code 100 and/or 200 previously described in connection with FIGS. 1A and 2, respectively, and part of an image captured by imager 212, as previously described in connection with FIG. 2.

At block 332, method 330 includes locating the detector code pattern of the bar code in the captured image. The detector code pattern can be located by, for example, an algorithm, in a manner analogous to that previously described herein (e.g., in connection with FIG. 2).

At block 334, method 330 includes determining the alignment of the decoder code pattern of the bar code. The alignment of the decoder code pattern can include, for example, the bounding areas (e.g., pixels), shape, and/or size of the decoder code pattern, and/or the pixel locations of the information encoded by the decoder code. The alignment of the decoder code pattern can be determined based on, for example, the start and/or end of the detector code pattern of the bar code, the shape of the detector code pattern, and/or the intensity of the detector code pattern.

At block 336, method 330 includes decoding the bit information of the decoder code pattern. The bit information of the decoder code pattern can be decoded by, for example, applying a decoder algorithm on the decoder code pattern, as previously described herein (e.g., in connection with FIG. 2). Although not shown in FIG. 3, block 336 may also include the process of combining images from multiple imagers, if available, prior to decoding. At block 338, method 330 includes assembling the bits to form a binary code.

Although some embodiments and examples of the present disclosure have been described with respect to IR (e.g., NIR) absorptive materials, reflective materials, and illumination, embodiments of the present disclosure are not so limited. For example, such embodiments and examples could include UV absorptive materials, reflective materials, and illumination instead of IR (e.g., NIR) absorptive materials, reflective materials, and a combination of materials which absorb and reflect light of different wavelengths, respectively.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used.

What is claimed:

1. A covert bar code, comprising:
    detector code, wherein the detector code includes a combination of responsive absorptive material and responsive reflective material; and
    decoder code, wherein the decoder code includes a combination of responsive absorptive material and responsive reflective material;
    wherein:
        the responsive absorptive material of the detector code, the responsive reflective material of the detector code, the responsive absorptive material of the decoder code, and the responsive reflective material of the decoder code each respond to wavelengths of infrared radiation, near infrared radiation, or ultraviolet radiation; and
        the responsive absorptive material of the detector code, the responsive reflective material of the detector code, the responsive absorptive material of the decoder code, and the responsive reflective material of the decoder code each respond to wavelengths of the same type of radiation.

2. The covert bar code of claim 1, wherein:
    the detector code is a reference code used to detect the presence and location of the covert bar code; and
    the decoder code includes information to be decoded by a bar code imager.

3. The covert bar code of claim 1, wherein the detector code and/or the decoder code includes alternating responsive absorptive and responsive reflective materials.

4. The covert bar code of claim 1, wherein the detector code and/or the decoder code includes consecutive responsive absorptive materials and/or consecutive responsive reflective materials.

5. The covert bar code of claim 1, wherein the covert bar code is a two-dimensional bar code.

6. The covert bar code of claim 5, wherein the detector code and/or the decoder code includes geometrical shapes and/or patterns.

7. The covert bar code of claim 5, wherein the decoder code is located in an area defined by the detector code.

8. The covert bar code of claim 5, wherein a design, shape, and/or size of the decoder code is based on an amount of information included in the decoder code.

9. The covert bar code of claim 5, wherein the decoder code includes a pattern of binary information defined by the responsive absorptive material of the decoder code and the responsive reflective material of the decoder code.

10. A system for detecting and decoding a covert bar code, comprising:
    a scanner configured to capture a covert bar code, wherein the covert bar code includes:
        detector code, wherein the detector code includes a combination of responsive absorptive material and responsive reflective material; and
        decoder code, wherein the decoder code includes a combination of responsive absorptive material and responsive reflective material; wherein:
            the responsive absorptive material of the detector code, the responsive reflective material of the detector code, the responsive absorptive material of the decoder code, and the responsive reflective material of the decoder code each respond to wavelengths of infrared radiation, near infrared radiation, or ultraviolet radiation; and
            the responsive absorptive material of the detector code, the responsive reflective material of the detector code, the responsive absorptive material of the decoder code, and the responsive reflective material of the decoder code each respond to wavelengths of the same type of radiation; and
    a pattern locator and detector configured to:
        search the captured covert bar code for the presence of the detector code; and
        decode the decoder code upon establishing the presence of the detector code.

11. The system of claim 10, wherein the scanner includes:
    an illuminator configured to emit infrared or ultraviolet light; and a camera responsive to the infrared or ultraviolet light emitted by the illuminator.

12. The system of claim 10, wherein the pattern locator and detector is configured to determine a location of the detector code in the image.

13. The system of claim 10, wherein the pattern locator and detector is configured to decode the decoder code by:
   determining a bounding shape and/or size of the decoder code; and
   applying a decoder algorithm on the decoder code enclosed in the bounding shape and/or size.

14. The system of claim 13, wherein the pattern locator and detector is configured to determine the bounding shape and/or size of the decoder code using the detector code.

15. The system of claim 10, wherein the pattern locator and detector is configured to determine an orientation of the decoder code using the detector code.

16. A method for detecting and decoding a covert bar code, comprising:
   locating a detector code pattern of a covert bar code in an image, wherein the detector code pattern includes a combination of infrared or ultraviolet absorptive material and infrared or ultraviolet reflective material;
   determining an alignment of a decoder code pattern of the covert bar code based on the detector bar code pattern, wherein the decoder code pattern includes a combination of infrared or ultraviolet absorptive material and infrared or ultraviolet reflective material;
   decoding bit information of the decoder code pattern; and
   assembling the decoded bit information to form a binary code.

17. The method of claim 16, wherein the alignment of the decoder code pattern includes at least one of:
   a bounding area of the decoder code pattern;
   a shape of the decoder code pattern; and
   a size of the decoder code pattern.

18. The method of claim 16, wherein the alignment of the decoder code pattern includes pixel locations of information encoded by the decoder code pattern.

19. The method of claim 16, wherein the method includes determining the alignment of the decoder code pattern based on at least one of:
   a start and/or end of the detector code pattern;
   a shape of the detector code pattern; and
   an intensity of the detector code pattern.

* * * * *